(12) United States Patent
Carlsen et al.

(10) Patent No.: US 6,490,720 B1
(45) Date of Patent: Dec. 3, 2002

(54) SEQUENCE NUMBERING MECHANISM TO ENSURE EXECUTION ORDER INTEGRITY OF INTER-DEPENDENT SMART CARD APPLICATIONS

(75) Inventors: Ulf Carlsen, Høvåg (NO); Håkon Hammerstad, Mandal (NO)

(73) Assignee: Sospita AS, Mandal (NO)

( * ) Notice: Subject to any disclaimer, the term of this patent is extended or adjusted under 35 U.S.C. 154(b) by 0 days.

(21) Appl. No.: 09/891,490

(22) Filed: Jun. 26, 2001

Related U.S. Application Data

(63) Continuation of application No. PCT/NO01/00201, filed on May 11, 2001.

(51) Int. Cl.[7] ................................................. G06F 9/44
(52) U.S. Cl. ...................................................... 717/127
(58) Field of Search ........................... 717/4, 131–132, 717/127; 380/255, 262, 200–201

(56) References Cited

U.S. PATENT DOCUMENTS

| | | | |
|---|---|---|---|
| 4,558,176 A | 12/1985 | Arnold et al. | |
| 5,625,785 A | * 4/1997 | Miura et al. | ............... 395/568 |
| 5,651,068 A | 7/1997 | Klemba et al. | |
| 5,825,877 A | 10/1998 | Dan et al. | |
| 5,826,080 A | 10/1998 | Dworzecki | |
| 5,841,869 A | 11/1998 | Merkling et al. | |
| 5,933,640 A | * 8/1999 | Dion | ............................ 717/4 |
| 6,038,646 A | 3/2000 | Sproull | |
| 6,061,449 A | 5/2000 | Candelore et al. | |
| 6,112,987 A | 9/2000 | Lambert et al. | |
| 6,117,185 A | * 9/2000 | Schmidt | ........................ 717/9 |
| 6,126,328 A | 10/2000 | Mallory et al. | |
| 6,223,287 B1 | * 4/2001 | Douglas et al. | ............. 713/178 |
| 6,282,656 B1 | 8/2001 | Wang | |
| 6,292,569 B1 | * 9/2001 | Shear et al. | ................. 380/255 |

FOREIGN PATENT DOCUMENTS

WO    WO 97/03398 A1    1/1997

* cited by examiner

*Primary Examiner*—Gregory Morse
*Assistant Examiner*—Wei Zhen
(74) *Attorney, Agent, or Firm*—Akin, Gump, Strauss, Hauer & Feld, L.L.P.

(57) ABSTRACT

Software code of a software program is executed in a multi-processor computer environment. The software code includes a first portion and a second portion. The first portion is executed in a computer. The second portion is executed in one or more tamper-resistant external devices which are in communication with the computer. The second portion includes a plurality of different blocks of code. At least some of the blocks have sequence data associated therewith. If sequence data exists in the current block of code to be executed in the one or more external devices, then the sequence data is used to determine if execution of the block of code is permissible or should be inhibited. The sequence data includes predecessor data and successor data.

17 Claims, 4 Drawing Sheets

Handling multiple alternative applet execution paths.

ATTACK ON PRIOR ART

Maintaining applet inter-dependency information in tamper resistant external device memory.

Maintaining applet inter-dependency information in encrypted applets.

Handling multiple alternative applet execution paths.

SEQUENCE NUMBERING MECHANISM TO ENSURE EXECUTION ORDER INTEGRITY OF INTER-DEPENDENT SMART CARD APPLICATIONS

CROSS-REFERENCE TO RELATED APPLICATIONS

This application is a continuation of copending International Application No. PCT/NO01/00201 filed May 11, 2001, entitled "SEQUENCE NUMBERING MECHANISM TO ENSURE EXECUTION ORDER INTEGRITY OF INTER-DEPENDENT SMART CARD APPLICATIONS", and which designated the United States.

BACKGROUND AND SUMMARY OF THE INVENTION

The present invention describes a mechanism for the protection of the correct execution-order of interdependent (interrelated) software applications. In particular, the present invention relates to software license protection for the shielded and timely execution of software applications through the use of tamper-resistant external devices, such as smart cards, USB tokens or other forms for tamper-resistant environments. The present invention also finds its applications in any traditional smart card security application area, such as e-payment, digital rights management (DRM), multi-media protection, authentication, biometry, public-key infrastructure (PKI), encryption-schemes, as an integrated part of special-purpose secure operating systems for tamper-resistant external devices, and the like. The present invention relates to International Application No. PCT/NO96/00171 designating the United States, now U.S. Pat. No. 6,266,416 (Sigbjormsen et al.), which is incorporated by reference herein. This patent describes a system for software license protection through the partial execution of a software application in a tamper-resistant external device.

In multi-processing computer environments, such as for example that provided by a dual-processor environment consisting of an (untrusted) host computer and a (trusted) external, tamper-resistant device such as a smart card or other token, software applications residing on the host computer are sometimes required to make more than one finction call to applications residing on the external device. Software applications which execute on external devices as described herein are also referred to as "applets." Generally speaking, the path of execution of a software application, whether that be a host application or an external device/ smart card applet, is critical for the correct functioning of the application. It is important that the execution path is not tampered with.

As a trivial example, an application which converts Celsius temperature degrees into Fahrenheit would need to perform the equation $F=9/5*C+32$. The multiplication of the Celsius degree by 9/5 must be carried out before the addition by 32. According to the prior art, correct execution order is ensured by letting the function in its entirety be executed in a tamper-proof environment, as an applet, allowing just one function-call entry from the host application to the applet. Since the applet resides on the tamper-resistant smart card, it may not be tampered with, and since the applet has just one entry-point, there is no way the addition operation can possibly be performed before the multiplication operation. Functional atomicity, integrity and correct execution order has been ensured.

If the function $F=9*C/5+32$ nonetheless was to be split into three applets, as illustrated in FIG. 1; applet 1 as $i=9*C$, applet 2 as $i=i/5$ and applet 3 as $F=i+32$, each with a separate function entry point, then, according to the prior art, no mechanism allows the external device to discover and hinder an adversary from modifying the host application by reversing applet function calls towards the external device, e.g., calling applet 3 before applet 1, or by removing one or several calls, to thereby break the integrity of the compound smart card application.

FIG. 2 shows a scenario where the adversary has removed the call to applet 2, causing the external device to return a corrupt result. Thus, a tamper-proof device does not in general suffice to maintain the correct execution order and overall applet integrity.

A first objective of the present invention is to provide an integrity protection mechanism that allows a smart card application to be split into more than one sub-applications in a safe manner, enforcing correct execution order and application integrity, and to allow the execution environment of the external device to discover any attempts to process applets in an illegal order or manner. This facility opens up new technological possibilities. A second objective of the present invention is to facilitate, for the purposes of software license protection and other application areas indicated above, the selection of software application components suitable and not suitable for execution on the tamper-resistant device, in an unconstrained manner, thereby providing an efficient and highly user-friendly tool for optimization of application security and performance.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings.

DETAILED DESCRIPTION OF THE INVENTION

Figure 1:
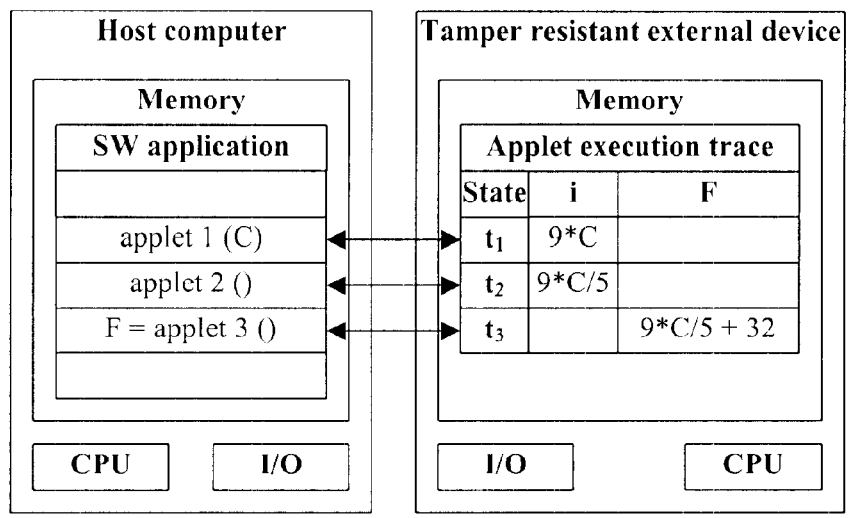
FIG. 1 is a schematic block diagram of a prior art multi-processor computer environment for executing a portion of code in an external device.

Certain terminology is used herein for convenience only and is not to be taken as a limitation on the present invention. In the drawings, the same reference letters are employed for designating the same elements throughout the several figures.

The present invention binds applet processing sequence data (e.g., sequence numbers or other identifiers such as random numbers or discrete time values) together with the actual applet code, thereby enforcing applets to be executed in a correct sequence determined by the sequence data. Each applet must have a unique identity. For each applet, the sequence data contains information about the set of predecessor applets allowed to be executed before the current applet, and the set of successors allowed to be executed after the current applet. The sets of predecessors and successors may be empty, or may contain one or several elements (applet identities), or may contain wild cards that define a specific group of applets. In summary, for each applet, the sequence data identifies the set of applets that precede and succeed the current applet, and the sequencing information needs to be inherently linked to the actual applet code.

The special predecessor and successor code * is used as a wild card. A predecessor code * indicates that, from the point of view of the current applet, any other applet may be executed before it. For example, in FIG. 3, applet 1's predecessor is specified as *, which implies that applet 1 does not put any constraints to what applet, if any, was executed beforehand. Applet 2, on the other hand, specifically states that its successor shall be applet 3. So, even if applet 1 allows applet 2 to be its predecessor, then applet 2 does not allow applet 1 to be its successor. In other words, execution of an applet only takes place if both predecessor and successor conditions are satisfied.

Other types of wild cards than * may be imagined, describing different constraints on applets or different applet subsets.

Two main embodiments of the present invention are described herein. In the first embodiment, illustrated in FIG. 3, the applet identifier, predecessor/successor information and applet code is stored in the external device, out of reach from tampering by the adversary. In a second embodiment, illustrated in FIG. 4, the applet identifier and predecessor/successor information is bound in the actual applet code, which then is protected for integrity and/or confidentiality by means of standard encryption techniques.

Figure 3:
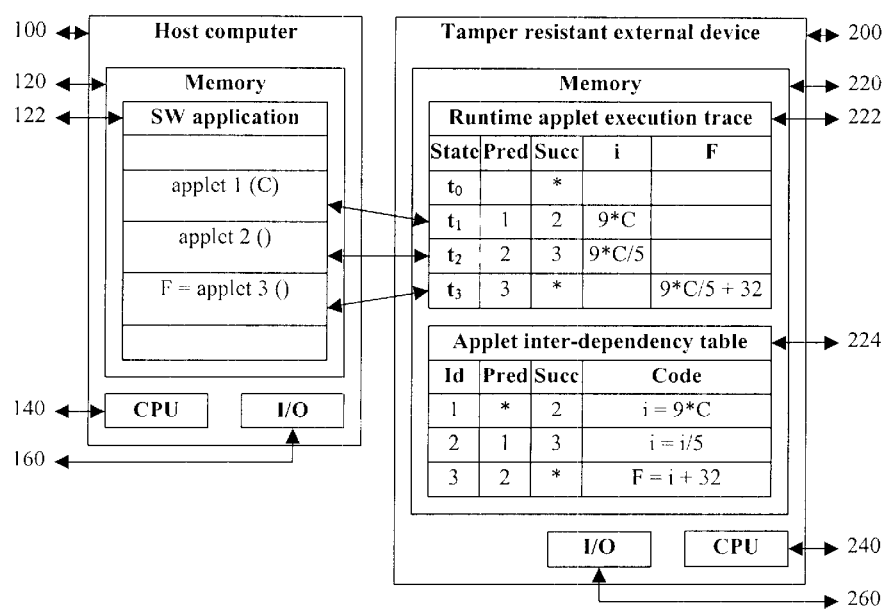
FIG. 3 shows a schematic block diagram of a multi-processor computer environment for executing a portion of code in an external device in accordance with a first embodiment of the present invention.

FIG. 3 shows sequence data and external device tracking in the example set forth above. In this figure, both predecessor and successor sequence data are used and tracked to illustrate the invention concept. For example, the encrypted applet 1 in the host software application has no specific predecessor, but has applet 2 as its sole rightful successor; applet 2 has applet 1 as its only predecessor and applet 3 as its only successor; and applet 3 has applet 2 as its only predecessor, but no specific successor.

Referring to the external device tracking, at time t1 (which corresponds to memory state t1 in memory 222 of FIG. 3), applet 1 has executed, and applet 1 was the last applet to cute; at time t2 (which corresponds to memory state 2 in memory 222), applets 1 and 2 have executed, and applet 2 was the last block to execute; and at time t3 (which corresponds to memory state 3 in memory 222), applets 1, 2 and 3 have executed, and applet 3 was the last block to execute.

The predecessor and successor data are checked against the data tracked by the external device 200 before the block of code can be executed. For example, before applet 2 is executed, the external device 200 looks up applet 2's rightful predecessors in memory 224 in FIG. 3, i.e., applet 1, and then checks whether applet 1 actually was the last executed in the previous state t1 in memory 222. The external device 200 then checks if the current applet 2 is a rightful successor of applet 1 by looking up the successor information at the previous state t1 in memory 222. If so, applet 2 is executed. If not, applet 2 cannot be executed.

Figure 2:
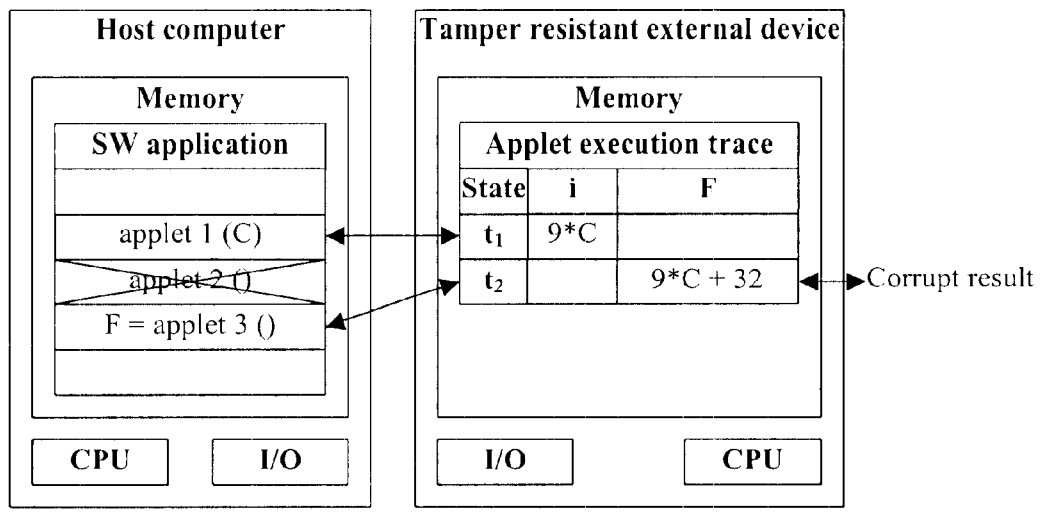
FIG. 2 shows how an attack can be conducted on the environment of FIG. 1.

Consider again the attack set forth in FIG. 2 in view of the present invention and the embodiment according to FIG. 3. If an adversary replaces the call to applet 2 by a call to applet 3, the external device 200 will not execute applet 3 because the successor to applet 1 according to memory 224 can only be applet 2, and also because the predecessor of applet 3 according to the same memory 224 is applet 2, and not applet 1 as state t1 of memory 222 contains.

Figure 4:
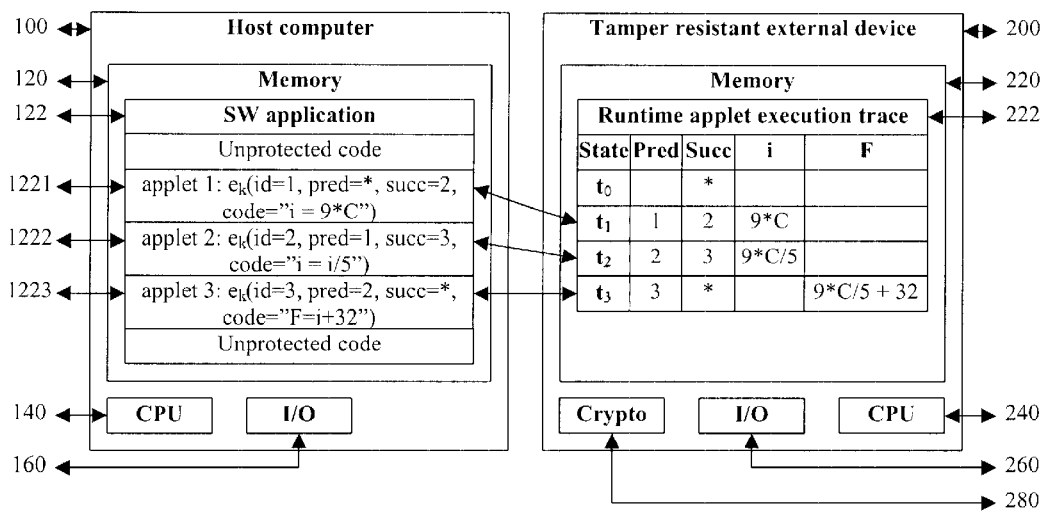
FIG. 4 shows a schematic block diagram of a multi-processor computer environment for executing a portion of code in an external device in accordance with a second embodiment of the present invention.

FIG. 4 shows a second embodiment of the present invention. Here, encrypted sequencing data 1221, 1222 and 1223 are embedded into each separate applet, alleviating memory 224 of FIG. 3. During execution, the external device 200 receives applets from the host software program 122. For each applet received, the external device 200 verifies that this applet follows a valid execution path according to the information stored in the applet execution trace memory 222. For instance, when the external device 200 receives applet 2, the applet is first decrypted, then the external device 200 looks up applet 2's rightful predecessors in the applet body 1222, which turns out to be applet 1, and then checks whether applet 1 actually was the last executed in the previous state t1 in memory 222. The external device 200 then checks if the current applet 2 is a rightful successor of applet 1 by looking up the successor information at the previous state t1 in memory 222. If so, applet 2 is executed. If not, applet 2 cannot be executed.

Consider again the attack set forth in FIG. 2 in view of the present invention and the embodiment according to FIG. 4. If an adversary replaces the call to applet 2 by a call to applet 3, the external device 200 will not execute applet 3 because the successor to applet 1 according to memory 224 can only be applet 2, and also because the predecessor of applet 3 according to the same memory 224 is applet 2, and not applet 1 as state t1 of memory 222 contains.

The embodiments illustrated in FIG. 3 and FIG. 4 each has its advantage: FIG. 3 allows for the storage of applets and associated predecessor and successor information in memory 224 inside the external device 200. This reduces communication between host 100 and external device 200. During runtime, only the applet identifier and associated I/O parameters are transferred between the host application 122 and the external device 200. On the other hand, storing encrypted applets on host memory 110 and allowing these to be uploaded to the external device 200 during runtime, reduces memory usage on the external device 200. These approaches may be combined.

Applets 1, 2 and 3 in FIGS. 3 and 4 are executed in strictly sequential order. Each applet has exactly one predecessor and exactly one successor. In software applications, this is a special case, and not the general rule. The prior art holds a solution to this special case: Standard encryption methods teach encryption chaining methods, such as, for example, Cipher Block Chaining (CBC) defined in Federal Information Processing Standards Publication 81, DES Modes of Operation, December 1980 (FIPS PUB 81), whereby one cipher block is cryptographically linked to the previous. Using CBC, it is not possible to decrypt and, for the purpose described herein, execute applet i+1 without first having decrypted and executed applet i. Furthermore, for some crypto block i+1, cryptographic chaining mechanisms offer no solution to the problem of having two different blocks i and i'which both yield a correct decryption of block i.

Figure 5:
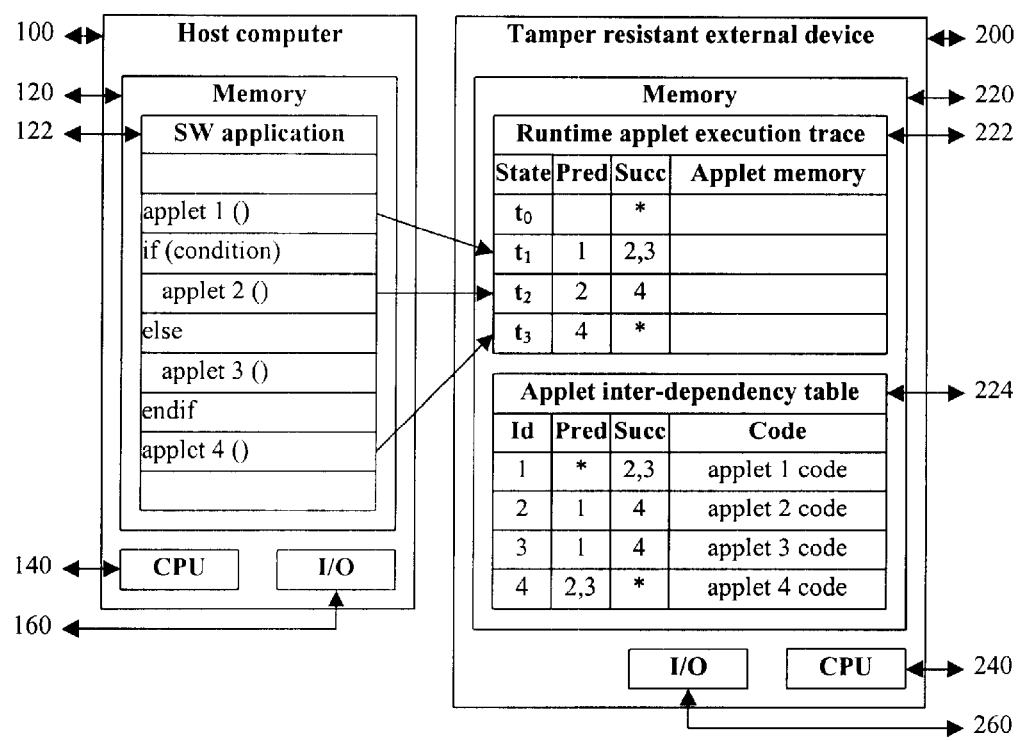
FIG. 5 shows how the present invention provides a general solution to controlling multiple alternative applet execution paths.

FIG. 5 shows that the present invention provides a general solution to controlling multiple alternative applet execution paths, thus overcoming the limitation of cryptographic chaining mechanisms and other prior art. In FIG. 5, applet 4 has two possible predecessors; applets 2 and 3. This is reflected in the entry for applet 4 in memory 224, which informs the external device that both applets 2 and 3 are rightful predecessors of applet 4.

The present invention is trivially generalized to handle multiple tamper-resistant external devices: From the view of a host software application, it has the capability to perform calls to applets on several (different) external devices. Likewise, from the view of an external device, any number of applications from different hosts (and even from other external devices) may place calls to applets within the present external device, without interfering the security mechanism described herein.

The present invention may also be extended to allow any particular applet to execute on any of a set of more than one external devices. In this scenario, the external device currently in charge of determining if an applet is allowed execution needs to fetch the relevant execution trace of preceding applets, including a mechanism to maintain the integrity of this information, in order to determine whether or not the current applet has the right to be executed.

Changes can be made to the embodiments described above without departing from the broad inventive concept thereof. The present invention is thus not limited to the particular embodiments disclosed, but is intended to cover modifications within the spirit and scope of the present invention.

What is claimed is:

1. A method of executing software code of a software program in a multi-processor computer environment, the software code including (i) a first portion to be executed in the computer, and (ii) a second portion, the second portion including a plurality of different blocks of code, at least some of the blocks having sequence data associated therewith, the method comprising:

(a) executing the second portion of code in one or more tamper-resistant devices which are in communication with the computer; and (b) if sequence data exists in the current block of code to be executed in the one or more tamper-resistant devices, using the sequence data to determine if execution of the block of code is permissible or should be inhibited.

2. The method of claim 1 wherein the blocks of code having sequence data associated therewith each include (i) an applet ID, (ii) predecessor data indicating one or more specific blocks of code that must have been executed immediately before the block of code that has the sequence data associated therewith, (iii) successor data indicating one or more specific blocks of code that must be executed immediately after the block of code that has the sequence data associated therewith, (iv) and applet code.

3. The method of claim 2 wherein the applet identifier, sequence data and applet code are each stored in the one or more tamper-resistant devices.

4. The method of claim 2 wherein the applet identifier and the sequence data is bound in the applet code, and the second portion of code containing the applet identifier, sequence data and applet code is encrypted.

5. The method of claim 1 wherein the second portion of code is encrypted, the method further comprising:

(c) decrypting the second portion of code in the one or more tamper-resistant devices prior to execution.

6. The method of claim 1 further comprising:

(c) tracking in the one or more tamper-resistant devices data regarding which blocks of code of the second portion have been executed therein, wherein step (b) further comprises comparing any sequence data in the current block of code to be executed with the tracked data to determine if execution of the block of code is permissible or should be inhibited.

7. The method of claim 1 wherein sequence data includes predecessor data indicating one or more specific blocks of code that must have been executed immediately before the block of code that has the sequence data associated therewith.

8. The method of claim 1 wherein the sequence data includes successor data indicating one or more specific blocks of code that must be executed immediately after the block of code that has the sequence data associated therewith.

9. The method of claim 1 wherein the plurality of different blocks of code are interspersed within the first portion of code.

10. The method of claim 1 further comprising:

(c) the computer sending the second portion of code to the one or more tamper-resistant devices for execution therein, the computer receiving back state information from the one or more tamper-resistant devices upon successful execution of the second portion of code.

11. The method of claim 1 wherein the one or more tamper-resistant devices are smart cards.

12. The method of claim 1 wherein the one or more tamper-resistant devices are USB tokens.

13. The method of claim 1 wherein the blocks of code are applets.

14. The method of claim 1 wherein the sequence data is wild card data indicating that either any block of code can be executed immediately before the block of code that has the wild card data associated therewith, or that no block of code needs to be executed immediately before the block of code that has the wild card data associated therewith.

15. The method of claim 1 wherein the second portion of code is stored in the computer and is downloaded into the one or more tamper-resistant devices prior to execution.

16. The method of claim 1 wherein the second portion of code is stored in the one or more tamper-resistant devices and is instructed to execute upon receipt of commands from the first portion of code.

17. The method of claim 1 wherein the software code is part of a software application program.

* * * * *